US008509532B2

(12) United States Patent
Ushiku

(10) Patent No.: US 8,509,532 B2

(45) Date of Patent: Aug. 13, 2013

(54) IMAGE PROCESSING APPARATUS, IMAGE PROCESSING METHOD, AND COMPUTER-READABLE MEDIUM

(75) Inventor: Toru Ushiku, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 13/085,599

(22) Filed: Apr. 13, 2011

(65) Prior Publication Data

US 2011/0268355 A1 Nov. 3, 2011

(30) Foreign Application Priority Data

Apr. 28, 2010 (JP) ................................ 2010-104231

(51) Int. Cl.
*G06K 9/00* (2006.01)

(52) U.S. Cl.
USPC .......................................................... 382/166

(58) Field of Classification Search
USPC ................. 382/162, 166, 165, 171, 181, 190, 382/232–233; 358/1.1, 1.9, 2.1, 3.01, 520, 358/538, 539, 426.01; 375/240, 240.24, E7.075, 375/E7.176, E7.258, E7.259
See application file for complete search history.

(56) References Cited

U.S. PATENT DOCUMENTS

| | | | | |
|---|---|---|---|---|
| 5,539,468 | A | 7/1996 | Suzuki et al. | 348/403 |
| 6,243,416 | B1 | 6/2001 | Matsushiro et al. | 375/240 |
| 6,731,400 | B1 | 5/2004 | Nakamura et al. | 358/1.9 |
| 7,321,693 | B2 | 1/2008 | Kadowaki | 382/232 |
| 2008/0259359 | A1 | 10/2008 | Tamura | 358/1.1 |
| 2009/0097072 | A1 | 4/2009 | Tamura | 358/3.01 |
| 2009/0323132 | A1 | 12/2009 | Yano et al. | 358/466 |
| 2010/0128295 | A1 | 5/2010 | Tamura | 358/1.12 |
| 2011/0109942 | A1 | 5/2011 | Kashibuchi et al. | 358/3.13 |
| 2011/0188750 | A1 | 8/2011 | Tamura | 382/167 |

FOREIGN PATENT DOCUMENTS

| | | | |
|---|---|---|---|
| JP | 05-316360 | A | 11/1993 |
| JP | 9-244832 | A | 9/1997 |
| JP | 10-136179 | A | 5/1998 |
| JP | 10-257488 | A | 9/1998 |
| JP | 2003-209698 | A | 7/2003 |
| JP | 2004-104621 | A | 4/2004 |
| JP | 2004-134962 | | 4/2004 |
| JP | 2004-153751 | A | 5/2004 |
| JP | 2008-271046 | | 11/2008 |
| JP | 2008-301373 | A | 12/2008 |
| JP | 2011-071767 | | 4/2011 |

OTHER PUBLICATIONS

U.S. Appl. No. 13/153,578, filed Jun. 6, 2011, Inventor: Minoru Kambegawa.

U.S. Appl. No. 13/051,141, filed Mar. 18, 2011, Inventor: Toru Ushiku.

*Primary Examiner* — Jose Couso

(74) *Attorney, Agent, or Firm* — Fitzpatrick, Cella, Harper & Scinto

(57) ABSTRACT

An image processing apparatus comprises: an unit configured to extract first color data and first attribute data from a pixel value, and to extract second to fourth color data and second to fourth attribute data corresponding to a second pixel value to a fourth pixel value corresponding to the arrangement pattern defined in a specified pattern flag; an unit configured to hold the pattern flag, the first color data, the second to fourth color data, the first attribute data, and the second to fourth attribute data; an unit configured to determine whether attribute data of all pixels included in a tile are identical; and an unit configured to perform control to delete the first attribute data and the second to fourth attribute data, and to store, in header information, information indicating that the attribute data in the tile are identical and information of the attribute data determined to be identical.

8 Claims, 14 Drawing Sheets

F I G. 3
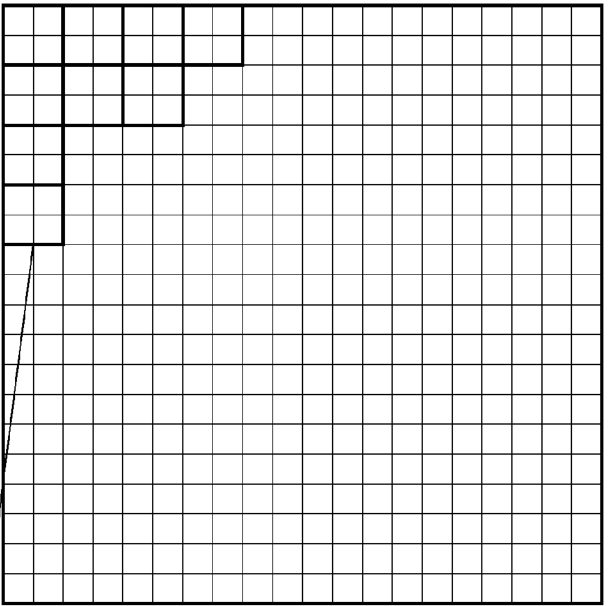
| IMAGE | |
|---|---|
| | SAME COLOR FOR ALL PIXELS : ONE PATTERN |
| 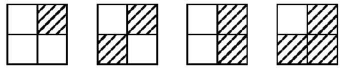 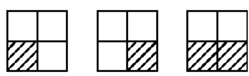 | TWO COLORS: SEVEN PATTERNS |
| 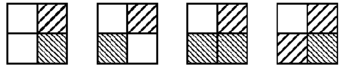 | THREE COLORS: SIX PATTERNS |
| | DIFFERENT COLORS FOR ALL PIXELS: ONE PATTERN |

401

| 1 | 2 |
|---|---|
| 3 | 4 |

402

| 1-2 | 1-3 | 1-4 | 2-3 | 2-4 | 3-4 |
|---|---|---|---|---|---|
| bit 0 | bit 1 | bit 2 | bit 3 | bit 4 | bit 5 |

| IMAGE | COMPARISON RESULT | | | | | | PATTERN FLAG |
|---|---|---|---|---|---|---|---|
| | 1 | 1 | 1 | 1 | 1 | 1 | 0 |
| | 0 | 1 | 1 | 0 | 0 | 1 | 1 |
| | 0 | 0 | 1 | 1 | 0 | 0 | 2 |
| | 0 | 1 | 0 | 0 | 1 | 0 | 3 |
| | 0 | 0 | 0 | 1 | 1 | 1 | 4 |
| | 1 | 0 | 1 | 0 | 1 | 0 | 5 |
| | 1 | 1 | 0 | 1 | 0 | 0 | 6 |
| | 1 | 0 | 0 | 0 | 0 | 1 | 7 |
| | 0 | 1 | 0 | 0 | 0 | 0 | 8 |
| | 0 | 0 | 1 | 0 | 0 | 0 | 9 |
| | 0 | 0 | 0 | 0 | 0 | 1 | A |
| | 0 | 0 | 0 | 1 | 0 | 0 | B |
| | 0 | 0 | 0 | 0 | 1 | 0 | C |
| | 1 | 0 | 0 | 0 | 0 | 0 | D |
| | 0 | 0 | 0 | 0 | 0 | 0 | E |

FIG. 4

START
INPUT 2 x 2 PIXELS
S501
COMPARE TWO PAIRED PIXELS
S502
CONVERT COMPARISON RESULT INTO PATTERN FLAG
S503
DETERMINE NUMBER OF COLORS
S504
S505
ONE COLOR?
NO
YES
S507
TWO COLORS ?
NO
YES
S509
THREE COLORS ?
NO
YES
S508
OUTPUT TWO PIXELS + PATTERN FLAG
S511
OUTPUT FOUR PIXELS + PATTERN FLAG
S510
OUTPUT THREE PIXELS + PATTERN FLAG
S506
OUTPUT ONE PIXEL + PATTERN FLAG
END

F I G. 10
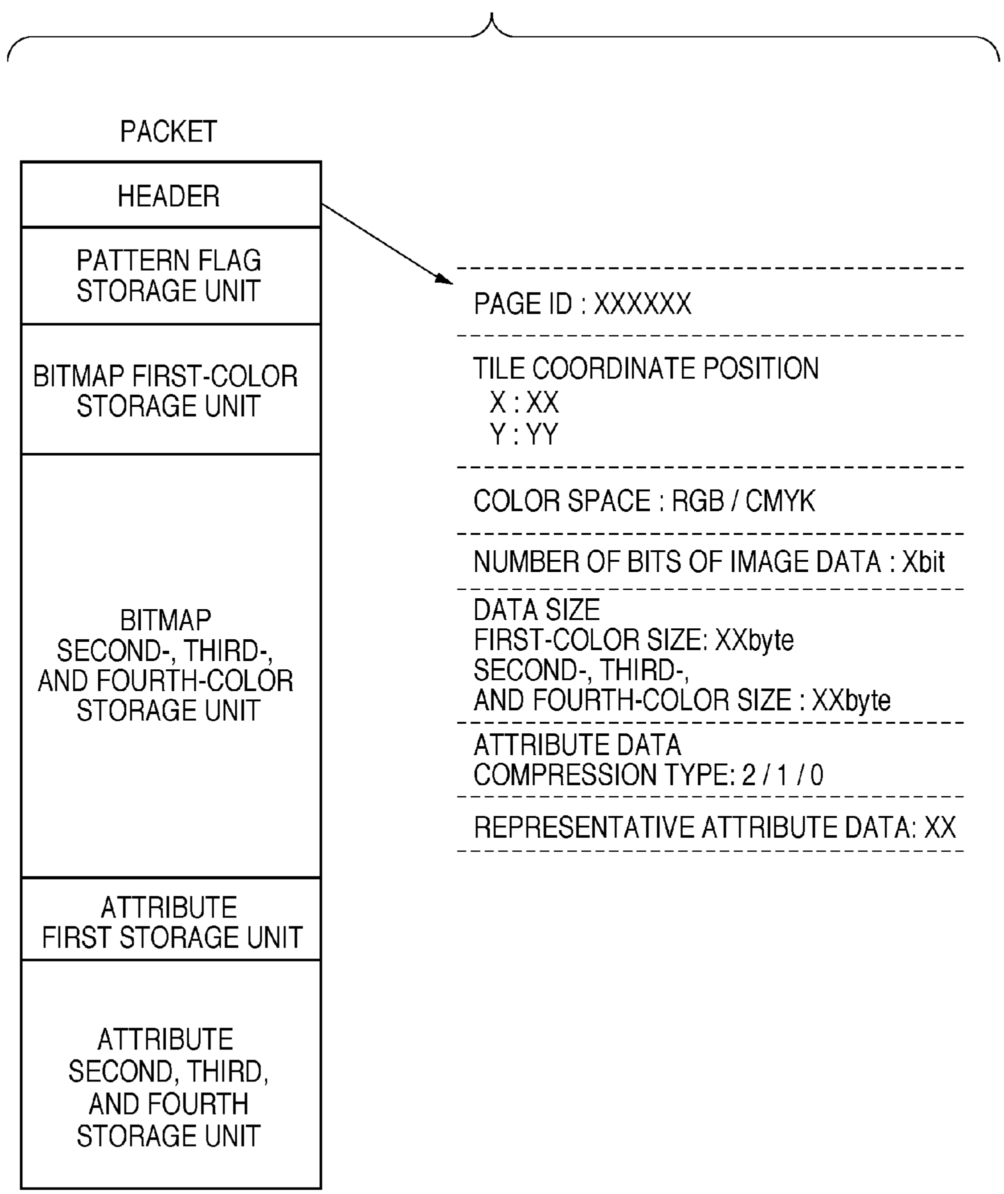

FIG. 11

| COORDINATE POSITION (X, Y) | PACKET SIZE (Byte) |
|---|---|
| (0, 0) | 32 |
| (1, 0) | 48 |
| (2, 0) | 36 |
| (3, 0) | 128 |
| ⋮ | ⋮ |
| (X, Y) | 36 |

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image compression technique and, more particularly, to an image compression technique to compress an information plane indicating attribute data unique to each pixel of image data of one page.

2. Description of the Related Art

In a conventional image generation apparatus, attribute data is added to each pixel in order to discriminate between texts/graphics/images present on the generated image. However, upon adding attribute data, the memory size required by the image generation apparatus inevitably increases. Hence, when the image generation apparatus has run out of memory, the attribute data is compressed to reduce the required memory size. However, texts and complex graphics, for example, have attribute data complexly inserted in them, so an expected compression result often cannot be obtained. To combat this situation, if attribute data does not fall within a predetermined size, a scheme of discarding this attribute data and setting one attribute data determined for the entire page has been adopted (for example, Japanese Patent Laid-Open No. 2003-209698). Alternatively, a scheme of dividing the entire page into blocks each having a predetermined size, and setting one attribute data determined for each block has been adopted (for example, Japanese Patent Laid-Open No. 2004-134962).

Unfortunately, when all attribute data are held for each pixel, the amount of attribute data becomes relatively large. Also, when one attribute data is set for the entire page or each block, as described above, all parts including texts, graphics, and images undergo uniform image generation processing, thus making it impossible to accomplish the original purpose of use of attribute data.

SUMMARY OF THE INVENTION

According to one aspect of the present invention, there is provided an image processing apparatus comprising: a tile division unit configured to divide image data, in which a pixel value of each pixel includes color data and attribute data, into tiles each including a predetermined number of pixels; a block division unit configured to divide each of the tiles, that are divided by the tile division unit, into blocks each having a size of 2×2 pixels; a specification unit configured to sequentially determine, as a processing object, each of the blocks divided by the block division unit, and to compare pixel values of respective pixels in the block that is the processing object, thereby specifying a pattern flag indicating an arrangement pattern of pixel values included in each of the blocks; an extraction unit configured to extract first color data and first attribute data from a pixel value corresponding to a pixel at a predefined position in each of the blocks, and further to extract, from a block for which it is determined that the number of pixel values included in the block is one of 2 to 4, second color data to fourth color data and second attribute data to fourth attribute data corresponding to a second pixel value to a fourth pixel value corresponding to the arrangement pattern defined in the specified pattern flag; a first holding unit configured to hold, in a memory, the pattern flag of each of the blocks, that is specified by the specification unit, the first color data extracted by the extraction unit, the second color data to fourth color data extracted by the extraction unit, the first attribute data extracted by the extraction unit, and the second attribute data to fourth attribute data extracted by the extraction unit; a first determination unit configured to determine whether attribute data of all pixels included in the tile are identical; and a deletion unit configured, if the first determination unit determines that the attribute data of all the pixels included in the tile are identical, to perform control to delete the first attribute data and the second attribute data to fourth attribute data, that are held in the first holding unit, and to store, in header information, information indicating that the attribute data in the tile are identical and information of the attribute data determined to be identical.

According to another aspect of the present invention, there is provided an image processing method comprising: a tile division step of using a tile division unit to divide image data, in which a pixel value of each pixel includes color data and attribute data, into tiles each including a predetermined number of pixels; a block division step of using a block division unit to divide each of the tiles, that are divided in the tile division step, into blocks each having a size of 2×2 pixels; a specification step of using a specification unit to sequentially determine, as a processing object, each of the blocks divided in the block division step, and compare pixel values of respective pixels in the block that is the processing object, thereby specifying a pattern flag indicating an arrangement pattern of pixel values included in each of the blocks; an extraction step of using an extraction unit to extract first color data and first attribute data from a pixel value corresponding to a pixel at a predefined position in each of the blocks, and further extract, from a block for which it is determined that the number of pixel values included in the block is one of 2 to 4, second color data to fourth color data and second attribute data to fourth attribute data corresponding to a second pixel value to a fourth pixel value corresponding to the arrangement pattern defined in the specified pattern flag; a first holding step of using a first holding unit to hold, in a memory, the pattern flag of each of the blocks, that is specified in the specification step, the first color data extracted in the extraction step, the second color data to fourth color data extracted in the extraction step, the first attribute data extracted in the extraction step, and the second attribute data to fourth attribute data extracted in the extraction step; a first determination step of using a first determination unit to determine whether attribute data of all pixels included in the tile are identical; and a deletion step of using a deletion unit to, if it is determined in the first determination step that the attribute data of all the pixels included in the tile are identical, perform control to delete the first attribute data and the second attribute data to fourth attribute data, that are held in the first holding step, and store, in header information, information indicating that the attribute data in the tile are identical and information of the attribute data determined to be identical.

According to the present invention, it is possible to prevent loss of attribute data that is unique to each pixel in compressing an information plane indicating the attribute data to attain a smaller compression size.

Further features of the present invention will become apparent from the following description of exemplary embodiments with reference to the attached drawings.

BRIEF DESCRIPTION OF THE DRAWINGS

FIG. 3 is a view showing the number of pattern combinations in a block of 2×2 pixels;

FIG. 4 is a view showing the relationship between the patterns shown in FIG. 3 and pattern flags;

FIG. 10 is a view showing the structure of packed data;

FIG. 11 is a table illustrating an example of the configuration of a packet management table;

DESCRIPTION OF THE EMBODIMENTS

A mode for carrying out the present invention will be described below with reference to the accompanying drawings. A digital MFP (MultiFunction Peripheral) having a plurality of functions such as scanning, printing, and copying will be taken as an example of an image generation apparatus in an embodiment of the present invention.

[System Configuration]

Figure 1:
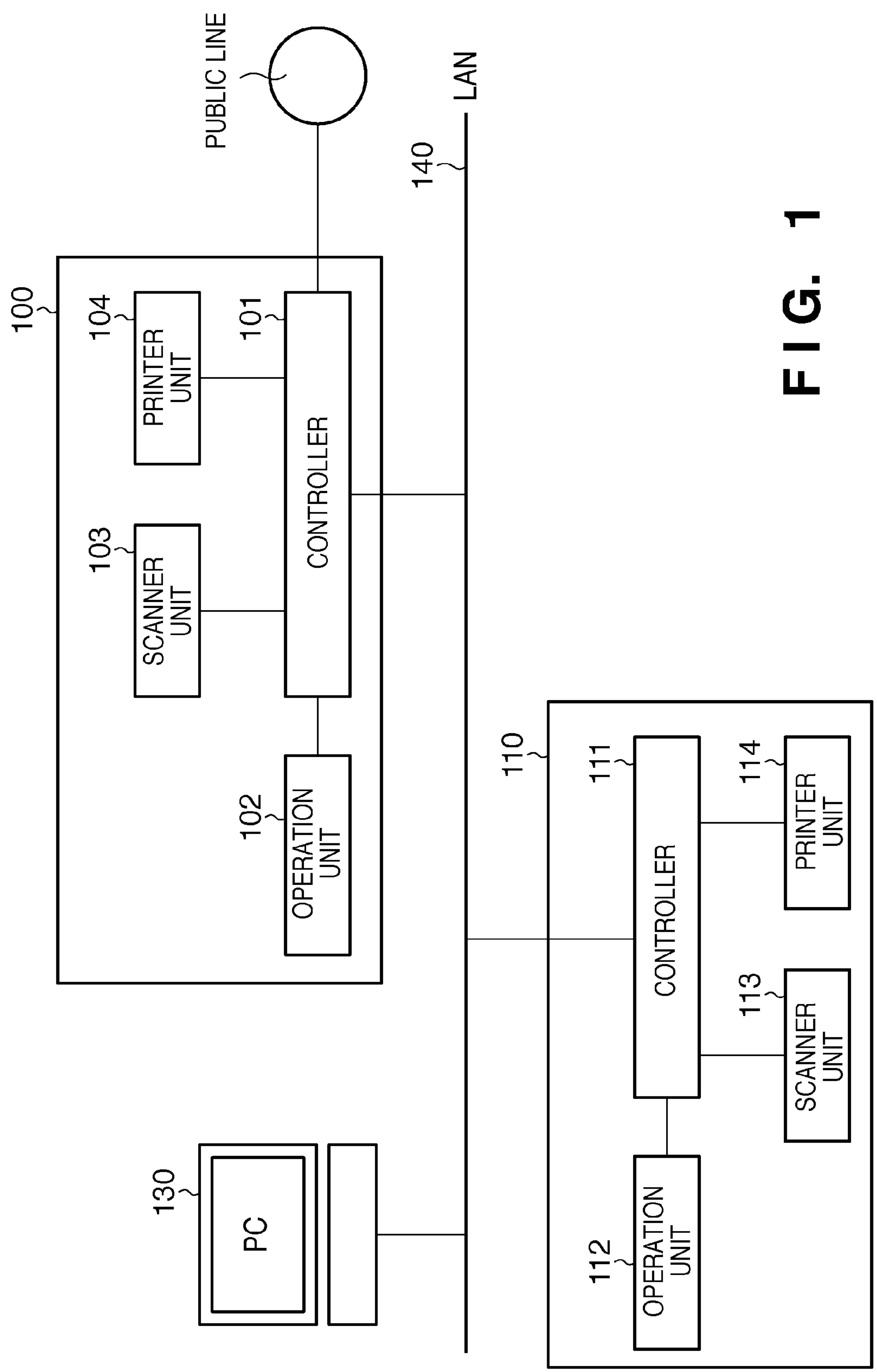
FIG. 1 is a block diagram illustrating an example of an image processing system according to an embodiment of the present invention.

FIG. 1 is a block diagram showing the configuration of an image processing system according to an embodiment of the present invention. Although a host computer 130 and two image processing apparatuses 100 and 110 are connected to a LAN 140 in this system, the image processing system in the present invention is not limited to the specific numbers of connections presented herein. Also, although a LAN is adopted as a connection method in this embodiment, the present invention is not limited to this. An arbitrary network such as a WAN (public line), a serial transmission scheme such as a USB, a parallel transmission scheme such as Centronics or SCSI, for example, can also be adopted. The image processing apparatus used herein applies to an image generation apparatus such as an MFP (MultiFunction Peripheral).

The host computer (to be referred to as a PC hereinafter) 130 has the function of a personal computer. The PC 130 can transmit/receive a file or e-mail using the FTP or SMB protocol via the LAN 140 or a WAN. Moreover, the PC 130 can issue a print command via a printer driver to the image processing apparatus 100 or 110.

The image processing apparatuses 100 and 110 have the same configuration, which includes a scanner unit. For the sake of descriptive simplicity, the configuration of only the image processing apparatus 110 will be described in detail below as a representative of the image processing apparatuses 100 and 110. The image processing apparatus 110 includes a scanner unit 113 serving as an image input device, a printer unit 114 serving as an image output device, a controller 111 which governs the overall operation control of the image processing apparatus 110, and an operation unit 112 serving as a user interface (UI).

Figure 2:
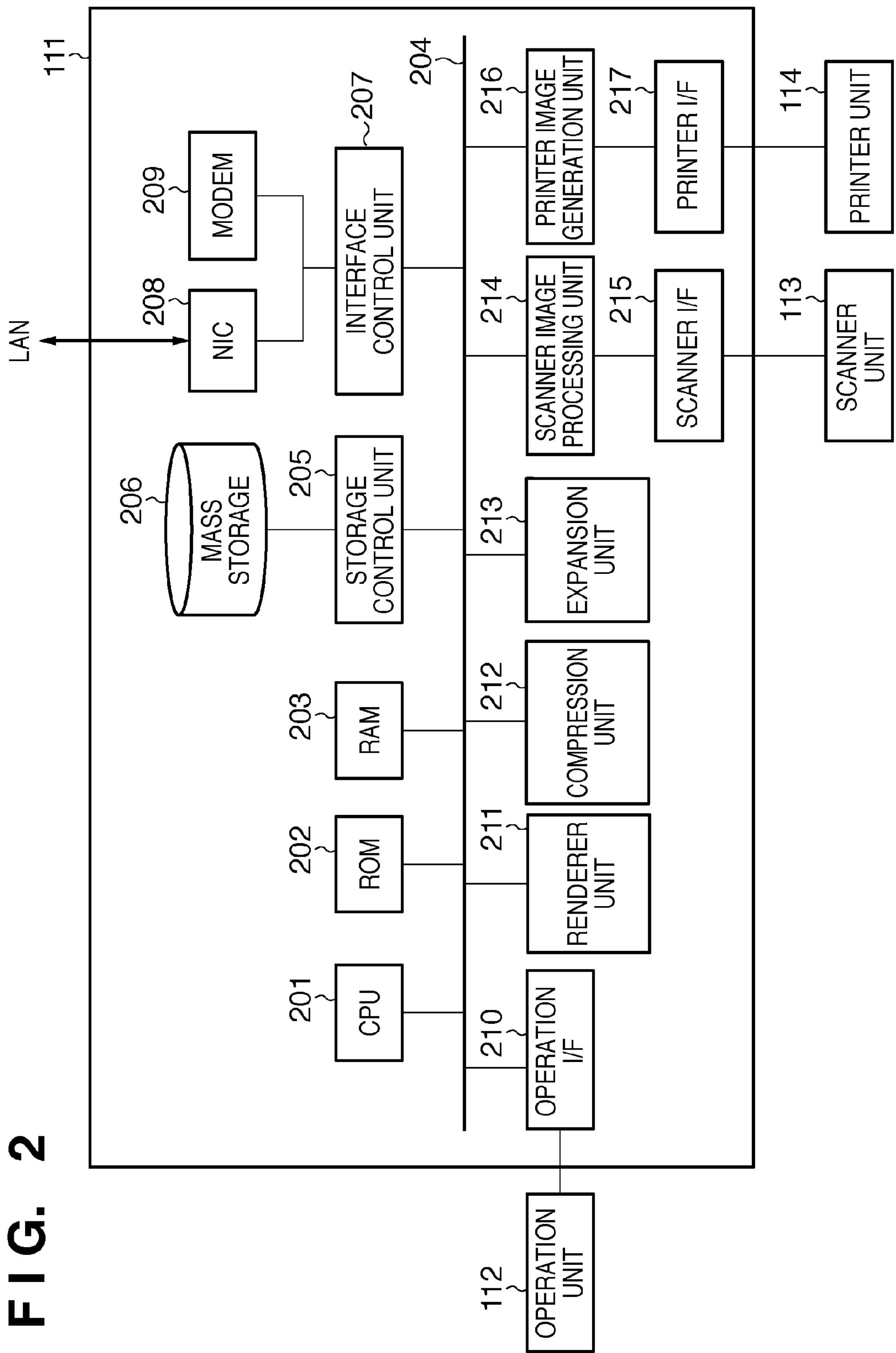
FIG. 2 is a block diagram illustrating an example of the configuration of a controller shown in FIG. 1.

FIG. 2 is a block diagram showing the configuration of the controller in this embodiment. A CPU 201 serves as a controller for controlling the overall image processing apparatus 110. The CPU 201 starts up the OS (Operating System) using a boot program stored in a ROM 202. A readable controller program and various types of application programs which are stored in a mass storage 206 are executed on the OS. The CPU 201 is connected to each unit via an internal bus such as a data bus 204. Also, the CPU 201 executes various types of processing in this embodiment. A RAM 203 operates as the main memory and a temporary storage area such as the working area of the CPU 201. The RAM 203 is also used as a temporary storage area for image processing. An interface control unit 207 controls a network I/F such as an NIC (Network Interface Card) 208 to transmit/receive various data including image data to/from a network such as a LAN. The interface control unit 207 also controls a modem 209 to transmit/receive data to/from a telephone line.

An operation I/F 210 receives a user operation instruction from the operation unit 112 such as a touch panel or a hard key. Also, the operation I/F 210 controls the operation unit 112 such as an LCD or a CRT to display an operation screen presented to the user. A renderer unit 211 generates bitmap data which can be processed by the printer unit 114 and attribute data, based on the data received via the interface control unit 207. A compression unit 212 compresses the bitmap data and the attribute data. An expansion unit 213 expands the data compressed by the compression unit 212 to generate bitmap data and attribute data.

A scanner image processing unit 214 corrects, processes, and edits bitmap data received via a scanner I/F 215 from the scanner unit 113. Note that the scanner image processing unit 214 determines whether the received bitmap data is, for example, a color document, a monochrome document, a text document, or a photographic document. The determination result is defined as attribute data and associated with the image data. A printer image generation unit 216 performs printer image processing, and transmits the above-mentioned bitmap data to the printer unit 114 via a printer I/F 217.

[Pattern Flag]

Image data compression processing according to this embodiment will be described in detail. In this embodiment, data compression processing is performed for each block including 2×2 pixels. Before a description of compression processing, the number of combinations of colors that occupy data of 2×2=4 pixels will be considered in accordance with the number of these colors. A block to be processed in this case includes four pixels, so a maximum of four colors occupy the block, and combinations of only one to four colors exist in the block. FIG. 3 shows the number of possible pattern combinations of these four colors.

First, when the block is occupied with only one color, the four pixels have the same color, so only one combination exists. A case in which the block has two colors will be considered next. As shown in FIG. 3, when two colors are laid out in the four pixels assuming that the upper left pixel has a first color and the other color is a second color, the first or second color is assigned to the three pixels other than the upper left pixel, so a total of seven combinations are possible upon excluding a combination when the four pixels have the same color.

A case in which the block has three colors will be considered. When three colors are laid out in the four pixels, one of the three colors is used twice, so the number of combinations when two out of the four pixels have the same color need only be obtained. In other words, in case of three colors, two coordinate positions are selected from the four coordinate positions, so a total of six combinations are possible. Lastly, when the block has four colors, only one pattern exists as in the case of only one color.

A total of 15 patterns are possible upon counting up the number of patterns in all cases of one to four colors. Considering that flags (identifiers) are assigned to all of these patterns to specify them, 4 bits are necessary as the amount of data of each flag. The relationship between these 15 patterns and the flags is defined as shown in FIG. 4, and these flags will be referred to as "pattern flags" hereinafter. The number and arrangement pattern of colors included in the block can be specified based on this pattern flag.

Although a pattern flag is defined for a block including 2×2 pixels in this embodiment, the present invention is not limited to this configuration. For example, a block including 3×3 or 4×4 pixels may be targeted. In this case, both the number of combinations defined as pattern flags and the amount of data on the flags increase.

[Compression Processing]

Figure 5:
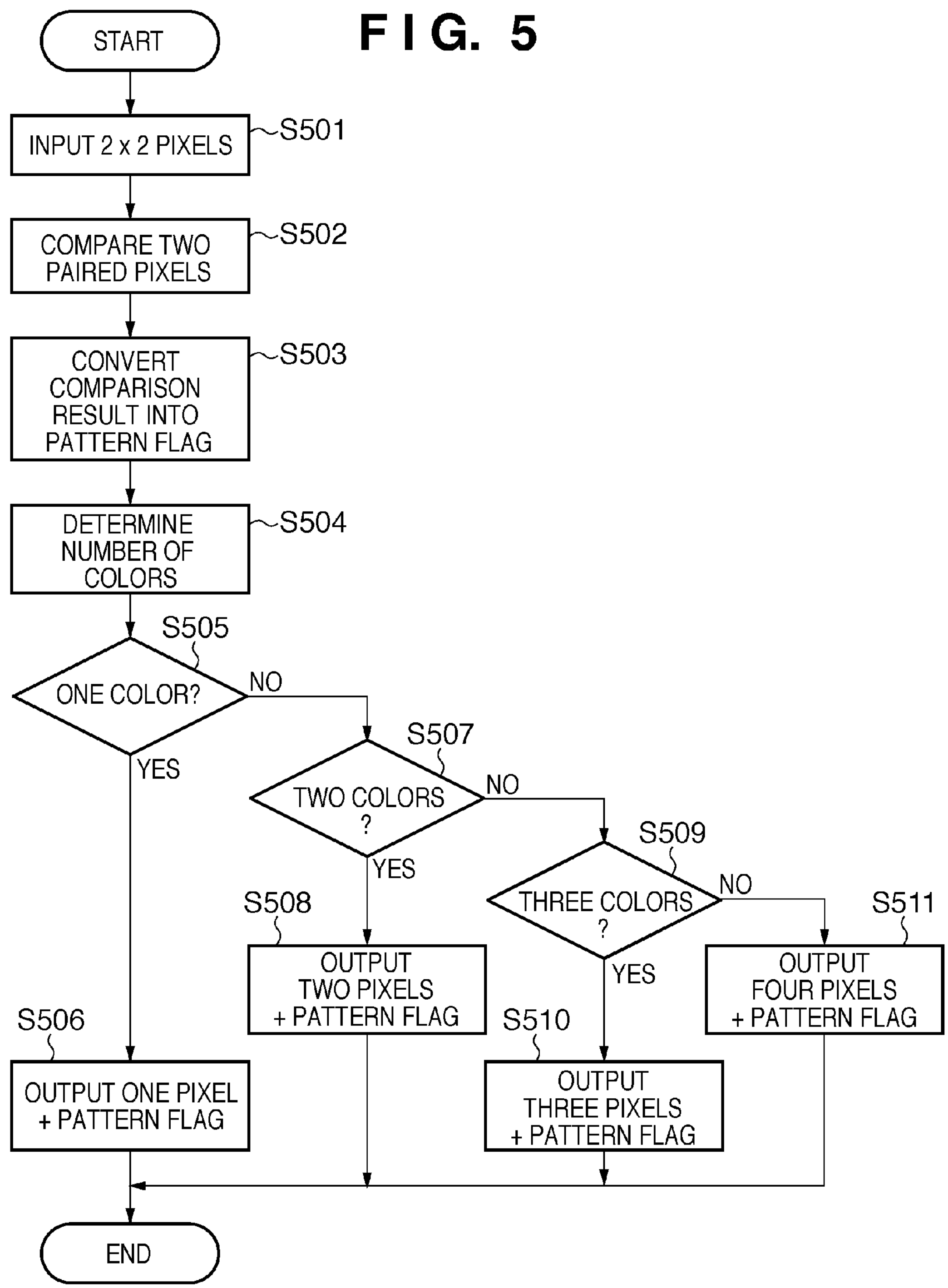
FIG. 5 is a flowchart showing processing of specifying a different number of pixels and a pattern flag.

Processing by the compression unit 212 will be described with reference to FIG. 5 in consideration of possible combinations of 2×2 pixels, as described above. Each pixel of the input image includes, for example, R, G, and B color data each with 8 bits (256 gray levels), and attribute data indicating the type of attribute such as a text, a photo, graphics, a background, or gray compensation. The attribute data is represented as 8-bit data, and the respective types of attributes can be identified. The following description assumes that an image represented by pixels each having a pixel value with 32 bits (the sum of 24 bits of R, G, and B color data and 8 bits of attribute data) is input. Note that in this embodiment, a combination of color data and attribute data will be collectively referred to as a pixel value. Note also that in this embodiment, this processing is performed by reading out and executing a program stored in a storage unit such as the ROM 202 by the CPU 201, unless otherwise specified.

When the processing starts, first, a block of 2×2 pixels is input (S501). Pairs of 32-bit pixel values (the sum of 24 bits of R, G, and B color data and 8 bits of attribute data) are compared for all combinations of two pixels in the input block (S502). If it is determined as a result of the comparison that all bits coincide between the two pixels, "1" is output; otherwise, "0" is output. The upper left, upper right, lower left, and lower right pixels of a block including 2×2 pixels have coordinate positions 1, 2, 3, and 4, respectively (reference numeral 401 shown in FIG. 4). Since the combinations of two pixels have a total of six sets of coordinate positions 1-2, 1-3, 1-4, 2-3, 2-4, and 3-4 (reference numeral 402 shown in FIG. 4), six comparisons must be made, and 6 bits are output as a result. As in the comparison results shown in FIG. 4, if all pixels in the block of 2×2 pixels have the same pixel value, is are output as all comparison results; or if all of the four pixels have different pixel values, 0s are output as all comparison results.

In this example, 15 patterns may occur from matching of the pixel values in the block of four pixels, so a 4-bit pattern flag is specified in accordance with the 6-bit comparison result (S503), as shown in FIG. 4. Pixel values (combinations of color data and attribute data) that have occurred in the four pixels and the number of pixel values are extracted (S504). As shown in FIG. 4, each pattern indicating the arrangement of respective pixel values in the block is associated with a 4-bit pattern flag (or a 6-bit comparison result), so the number of pixel values (color data and attribute data) and the pixel values in each block can be specified. Referring to FIG. 4 in this embodiment, the pattern flag is defined such that the pixel value of the upper left pixel becomes a first pixel value (first pixel value data) in all patterns. If the pattern flag is 0, the number of pixel values is 1, so the pixel value of the upper left pixel is extracted as a first pixel value. If the pattern flag is 1 to 7, the number of pixel values is 2, so the pixel value of the upper left pixel is extracted as a first pixel value, and that of a pixel at a position with a second pixel value (second pixel value data) defined in accordance with each pattern flag is further extracted. For example, when the pattern flag is 1, the pixel value of the upper right pixel, that is different from the first pixel value, is extracted as a second pixel value.

If the pattern flag is 8 to D, the number of pixel values is 3, so the pixel value of the upper left pixel is extracted as a first pixel value. Also, the pixel values of pixels at positions with a second pixel value (second pixel value data) and a third pixel value (third pixel value data) which are defined in accordance with each pattern flag are further extracted. For example, when the pattern flag is 8, the pixel value of the upper right pixel is extracted as a second pixel value, and that of the lower right pixel is extracted as a third pixel value. If the pattern flag is E, the pixel value of the upper left pixel is extracted as a first pixel value, that of the upper right pixel is extracted as a second pixel value, that of the lower left pixel is extracted as a third pixel value, and that of the lower right pixel is extracted as a fourth pixel value. That is, the number of pixel values in the block is specified (S505, S507, or S509) based on the pattern flag (or the comparison result), and a pattern flag and pixel values (color data and attribute data) corresponding to the specified number of pixel values are output (S506, S508, S510, or S511).

Figure 6:
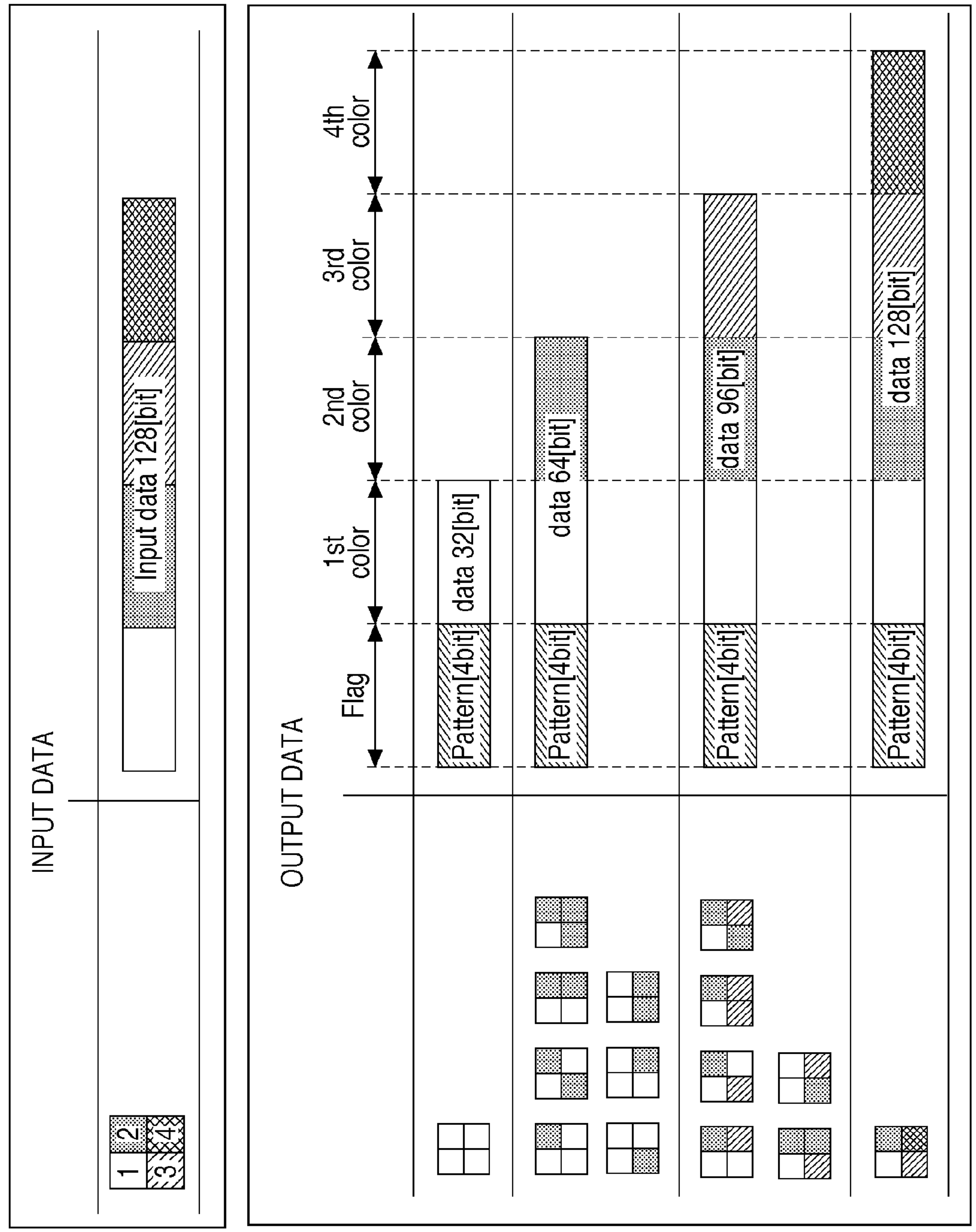
FIG. 6 is a view for explaining processing of determining the positions of pixels with different pixel values.

The output data will be described in more detail with reference to FIG. 6. As shown in FIG. 6, for example, if the pattern flag is 0 (that is, the four pixels have only one pixel value) (YES in step S505), none of the second and subsequent pixel values exist, so 4 bits of the pattern flag and the first pixel value (a pixel value corresponding to 1 pixel×32 bits (color data and attribute data)) are output (S506). If the pattern flag is 1 to 7 (that is, the four pixels have two pixel values) (YES in step S507), the coordinate position of a pixel with the second pixel value is calculated based on the pattern flag, and 4 bits of the pattern flag and two pixel values (pixel values corresponding to 2 pixels×32 bits (color data and attribute data)) are output (S508). If the pattern flag is 8 to D (that is, the four pixels have three pixel values) (YES in step S509), 4 bits of the pattern flag and three pixel values (pixel values corresponding to 3 pixels×32 bits (color data and attribute data)) are output (S510). If the pattern flag is E (that is, the four pixels have four pixel values) (NO in step S509), 4 bits of the pattern flag and four pixel values (pixel values corresponding to 4 pixels×32 bits (color data and attribute data)) are output (S511). In other words, pixel values (color data and attribute data) that have not previously occurred are output from each block in turn from the first pixel value when the pixels in the block are scanned in ascending order of coordinate position (the upper left, upper right, lower left, and lower right pixels have coordinate positions 1, 2, 3, and 4, respectively).

In this manner, by outputting a 4-bit pattern flag and pixel value data (data corresponding to pixel values (combinations of color data and attribute data) in a block of 2×2 pixels) included in this block from input data (128 bits) of four pixel values in this block, the amount of output data can be reduced with relatively simple processing. Especially in an image having a relatively large number of blocks each including pixels with the same pixel value (that is, blocks each having a relatively small number of pixel values) in a block of 2×2 pixels, the compression ratio of the amount of output data is relatively high. Also, the number of combinations of pixel values and the arrangement pattern of pixel values in the block can be specified by referring to the pattern flag. Performing such processing for all image blocks allows data compression of the entire image field. In this embodiment, for the sake of convenience, data on a pixel at a predetermined position (the upper left in a block in this case) will also be referred to as first color data and first attribute data, and data on the remaining pixels will also be referred to as second to fourth color data and second to fourth attribute data.

[Holding of Compressed Data]

The thus obtained pattern flag and pixel value data are written on the memory next. At this time, the positions where a pattern flag, first color data of an RGB bitmap (color data), second, third, and fourth color data of the RGB bitmap, first data of attribute data, and second, third, and fourth data of the attribute data are written are changed.

Figure 7:
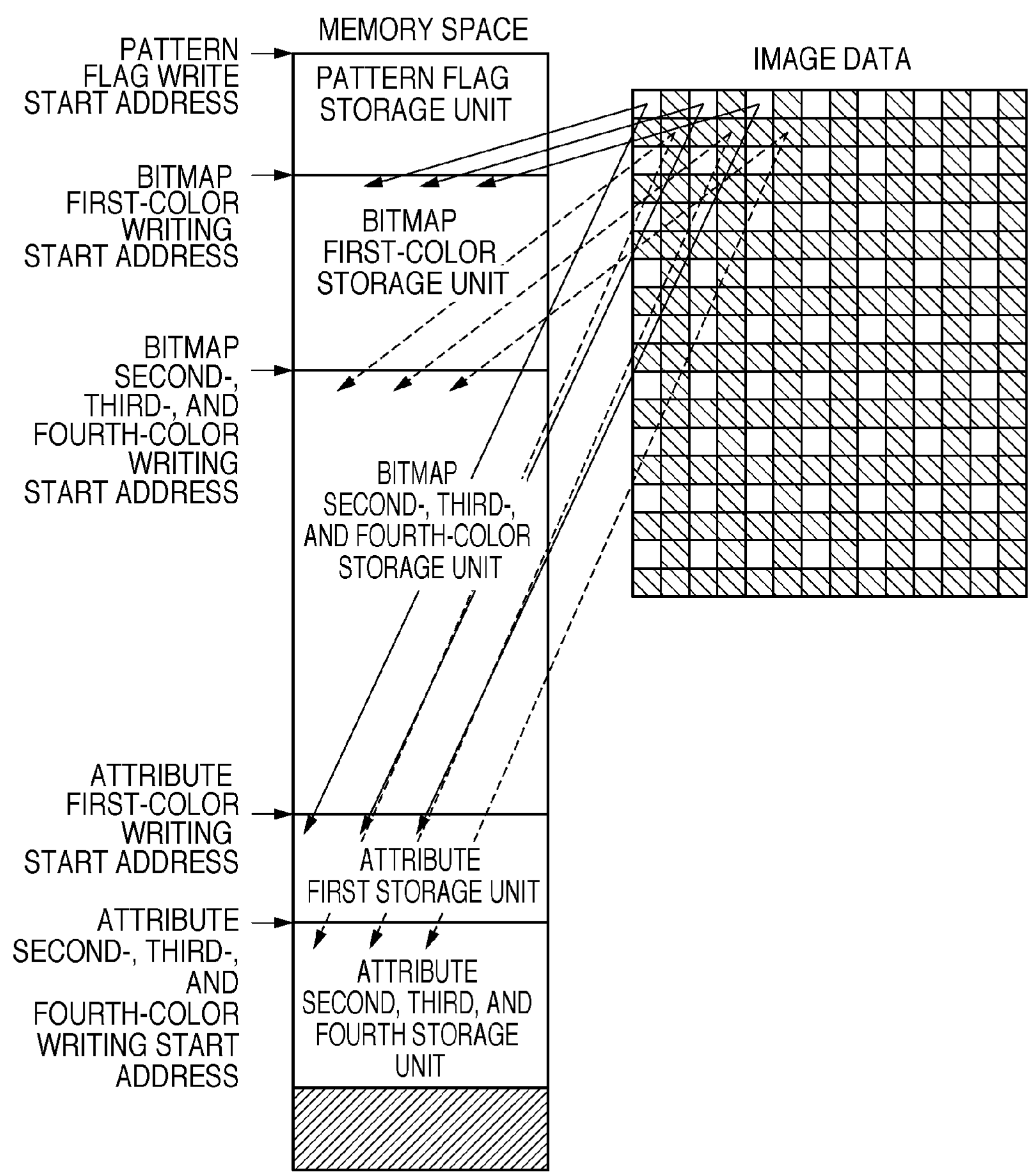
FIG. 7 is a view illustrating an example in which image data is written in a memory space by DMAC.

FIG. 7 is a view illustrating an example in which image data is written in the above-mentioned memory space. Note that when an image having a size of M×N pixels, R, G, and B data each with 8 bits, and attribute data with 8 bits is input to the compression unit 212, a pattern flag storage unit which stores pattern flag data has a data size of (M×N×4/8) bytes. A bitmap first-color storage unit which stores first color data of an RGB bitmap corresponding to a pixel with a first pixel value has a data size of (M×N×24/8) bytes. A bitmap second-, third-, and fourth-color storage unit which stores second, third, and fourth color data of the RGB bitmap corresponding to pixels with second to fourth pixel values, respectively, has a data size which differs depending on the type of image to be processed. This is because the number of blocks having the second, third, and fourth colors differs between individual images. Also, an attribute first storage unit which stores attribute data corresponding to the pixel with the first pixel value has a data size of (M×N×8/8) bytes. An attribute second, third, and fourth storage unit which stores attribute data corresponding to the pixels with the second, third, and fourth pixel values, respectively, has a data size which differs depending on the type of image to be processed. A first holding unit is defined using this format, and holds these data in the memory.

In the memory areas (the bitmap first-color storage unit and the bitmap second-, third-, and fourth-color storage unit) at memory addresses subsequent to the bitmap first-color writing start address, color data of each pixel is stored while the number of its bits is maintained intact. That is, the color (pixel value) of each pixel can be specified even without decoding and restoring compressed data to an image (even in compressing image data), unlike data compressed in, for example, the JPEG format. Similarly, attribute data corresponding to respective pixels are stored in the attribute first storage unit and the attribute second, third, and fourth storage unit while the numbers of their bits are maintained intact, and therefore can be specified even without decoding.

[Attribute Data Deletion Processing]

Figure 8A:
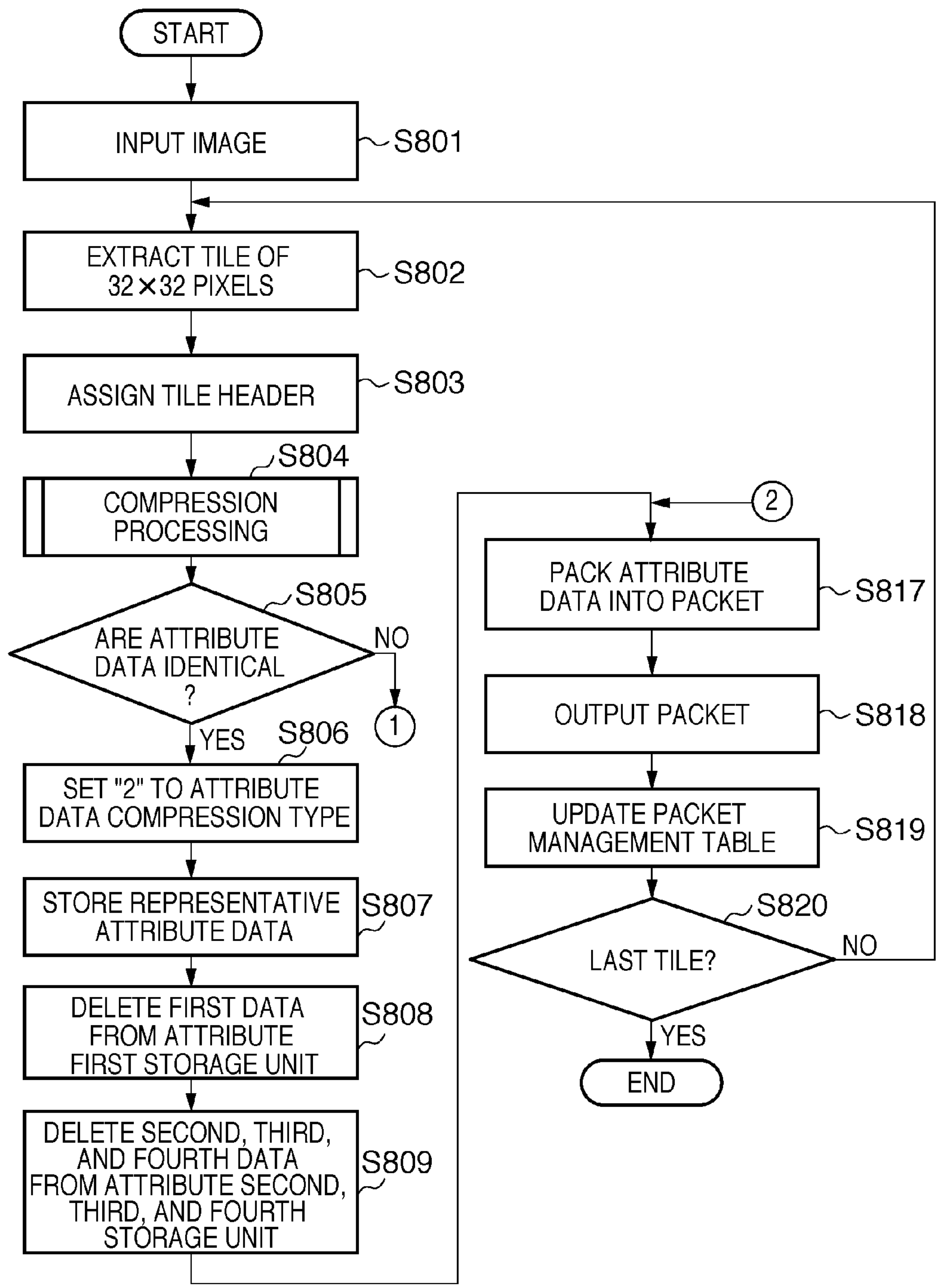
FIGS. 8A and 8B are flowcharts showing compression processing according to the embodiment.
Figure 8B:
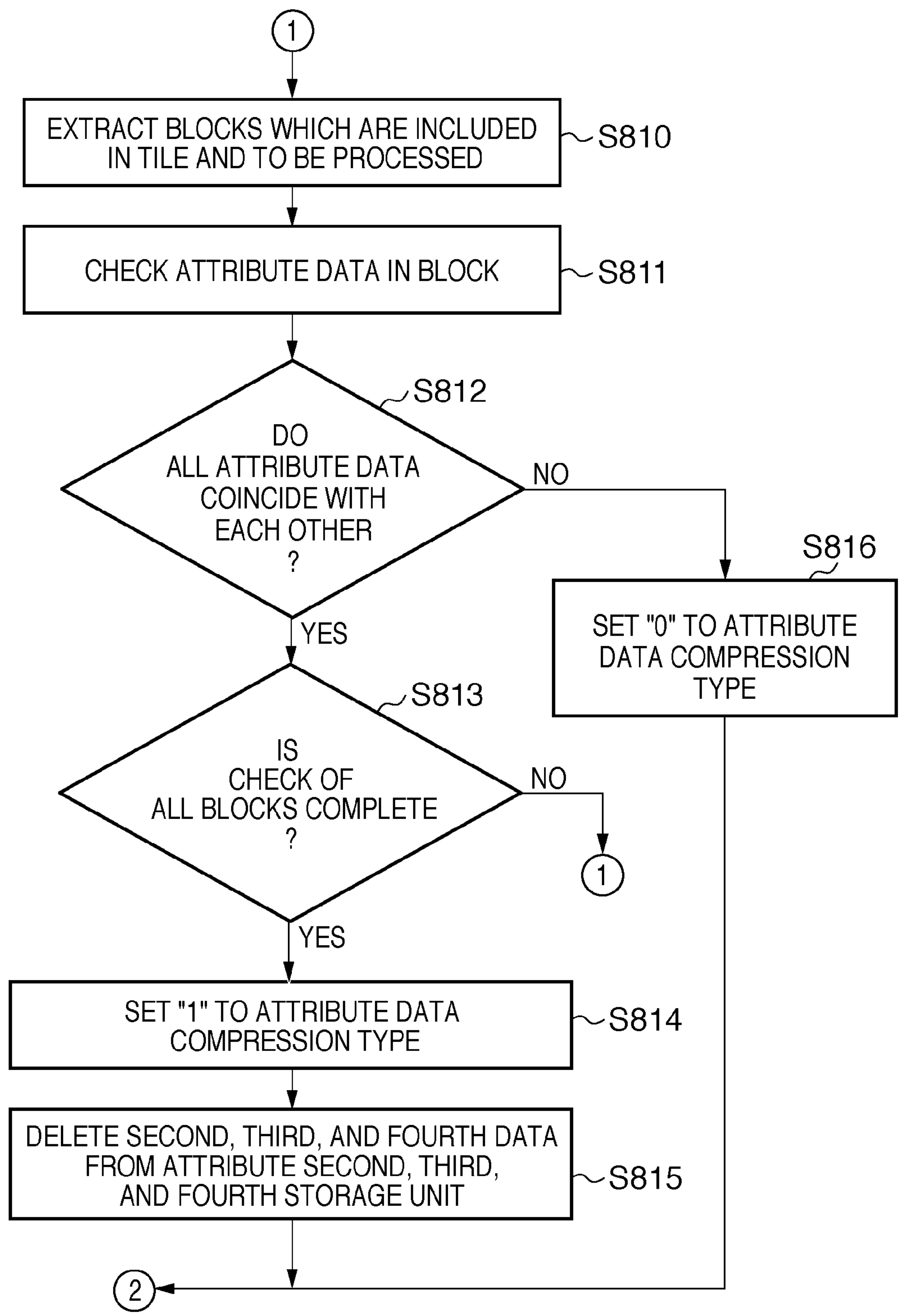
Figure 9:
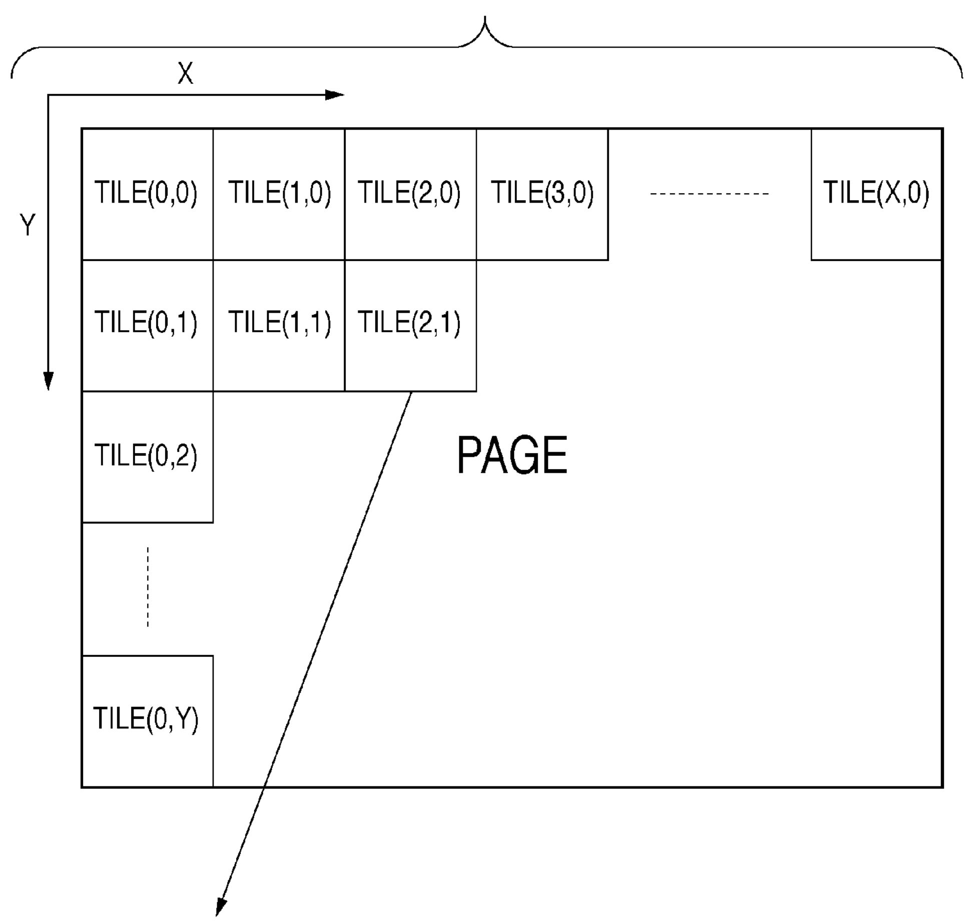
FIG. 9 is a view showing the relationship among a page, tiles each including 32×32 pixels, and blocks each including 2×2 pixels.
Figure 9:
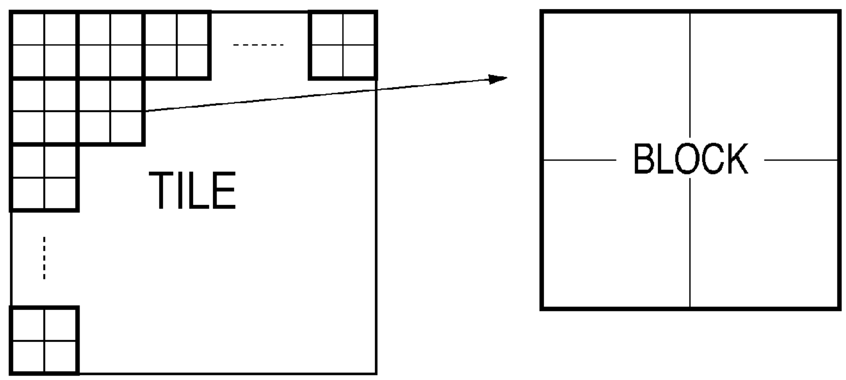

A method of deleting attribute data as a feature of the present invention will be described next with reference to FIGS. 8A and 8B. Note that in this embodiment, this processing is performed by reading out and executing a program stored in a storage unit such as the ROM 202 by the CPU 201, unless otherwise specified. When the processing starts, first, image data is input for each page shown in FIG. 8A (S801). Next, image data which is an input to the compression unit 212 is divided into blocks each including a predetermined number of pixels (2L×2L pixels) (S802). In this embodiment, a tile with a size of 32×32 pixels is used assuming that L=16. In the following description, a group of these divided pixels will be referred to as a "tile" in order to discriminate it from the block of 2×2 pixels described previously. A tile division unit is thus implemented. One tile includes 16×16 (L×L) blocks each including 2×2 pixels. FIG. 9 is a view showing the relationship among a page, tiles each including 32×32 pixels, and blocks each including 2×2 pixels. Although the tile size is set to 32×32 pixels in this embodiment, it can be changed in the present invention as well as the block size can be changed in the present invention, as described above. Hence, the tile size is not limited to 32×32 pixels. In other words, as shown in FIG. 9, each page includes tiles each including a predetermined number of pixels (2L×2L pixels in this embodiment), and each tile can be divided into blocks each including 2×2 pixels.

Header information with a predetermined fixed length is assigned to each tile (S803). The header information includes, for example, the page ID, the tile coordinate position, the color space, the number of bits of pixel data, the data size of a tile, the attribute data compression type, and the representative attribute data. The page ID indicates an ID number which is uniquely assigned to each page. The tile coordinate position is coordinate position information indicating the position of the tile on an image for each page. The coordinate position information is represented by a two-dimensional coordinate system defined by X- and Y-coordinates. The color space is information indicating an identifier used to identify whether the tile is an RGB image, a CMYK image, or a grayscale image. The number of bits of pixel data is information indicating the bit length per pixel in the tile. The data size is information indicating the sizes of first color data and second, third, and fourth color data of the tile in units of bytes. The attribute data compression type is information indicating the compression type (compression level) of attribute data. The representative attribute data is representative attribute data information. FIG. 10 illustrates an example of the configuration of the header information.

Compression processing is applied for each tile mentioned above (S804). Details of this compression processing are the same as those of the compression processing described above with reference to, for example, FIG. 5. By focusing attention only on the attribute data in each tile mentioned above, it is determined for each tile whether all attribute data of pixels included in this tile are identical (S805). A first determination unit is thus implemented. If all attribute data are identical (YES in step S805), "2" is set to the attribute data compression type in the header information (S806). That is, attribute data compression type "2" indicates that all attribute data in the tile corresponding to the header information are identical. The details of the identical attribute data are stored at the location of representative attribute data in the header information (S807). This representative attribute data becomes attribute data common to all pixels in the tile. The attribute data (first data of the attribute data and the second, third, and fourth data of the attribute data) corresponding to the pixels compressed to have a first pixel value and second, third, and fourth pixel values generated by the compression processing are deleted (S808 and S809). With this processing, the attribute data is compressed at a highest level.

On the other hand, if not all attribute data are identical for each tile (NO in step S805), the attribute data are checked for each block that constitutes this tile. That is, it is checked for each block included in a tile serving as a unit of compression processing whether the attribute data of pixels included in this block are identical. If the pattern flag of the block generated by the compression processing is "0", it can be determined that the attribute data in this block are identical without requiring another check of the attribute data of pixels included in this block. If the attribute data in each block are identical, the attribute data of pixel data, which is held as first attribute data, can be used as common data in this block, so the attribute data of pixel data, which are held as second, third, and fourth attribute data, can be deleted. Hence, it is determined for all blocks included in the tile whether the attribute data are identical for each block, and if all attribute data are identical, it is determined that the second, third, and fourth attribute data can be deleted.

If NO is determined in step S805, blocks included in the tile are sequentially extracted (S810). Attribute data corresponding to the extracted blocks are checked (S811). If all attribute data in each of the extracted blocks coincide with each other (YES in step S812), the process advances to step S813. A second determination unit is implemented by the determination processing in step S812. In step S813, it is determined for all blocks included in the tile whether the processing is complete. If the processing is complete (YES in step S813), the process advances to step S814. If the processing is incomplete (NO in step S813), the process returns to step S810, in which the processing is repeated for a block to be processed. If it is determined for all blocks included in the tile that the attribute data in each block coincide with each other (YES in step S813), "1" is set to the attribute data compression type in the header information (S814). That is, attribute data compression type "1" indicates that the attribute data in each block of the tile corresponding to the header information are identical. The second, third, and fourth data of the attribute generated by the compression processing are deleted (S815).

If not all attribute data coincide with each other in either block included in the tile (NO in step S812), "0" is set to the attribute data compression type in the header information (S816). In this case, compression processing is not performed for the attribute data. After the processing in steps S809, S815, and S816, the process advances to step S817.

The data processed in step S809, S815, or S816 are packed into one data, together with the header information of the tile (S817). FIG. 10 shows the structure of the packed data. The unit of data including the above-mentioned header will be referred to as a "packet" hereinafter. To generate such a packet (packet data), after the data size is determined upon completion of the processing in steps S804 to S816 for each tile, the data are packed without leaving vacant spaces between the bitmap first-color storage unit and second-, third-, and fourth-color storage unit and the attribute first storage unit and second, third, and fourth storage unit. After that, the data is output onto the memory (S818). The coordinate position and size of this packet are listed to generate a packet management table (S819). A table generation unit is thus implemented. FIG. 11 illustrates an example of this packet management table. By repeating the above-mentioned processing until the last block is processed (YES in step S820), compression processing of the image for each page is completed.

As the data to be deleted in step S808, the attribute data stored in the attribute first storage unit shown in FIG. 10 is targeted. Similarly, as the data to be deleted in step S809 or S815, the attribute data stored in the attribute second, third, and fourth storage unit shown in FIG. 10 are targeted. As the representative attribute data included in the header information, a value is designated when the attribute data compression type is "2".

Figure 12:
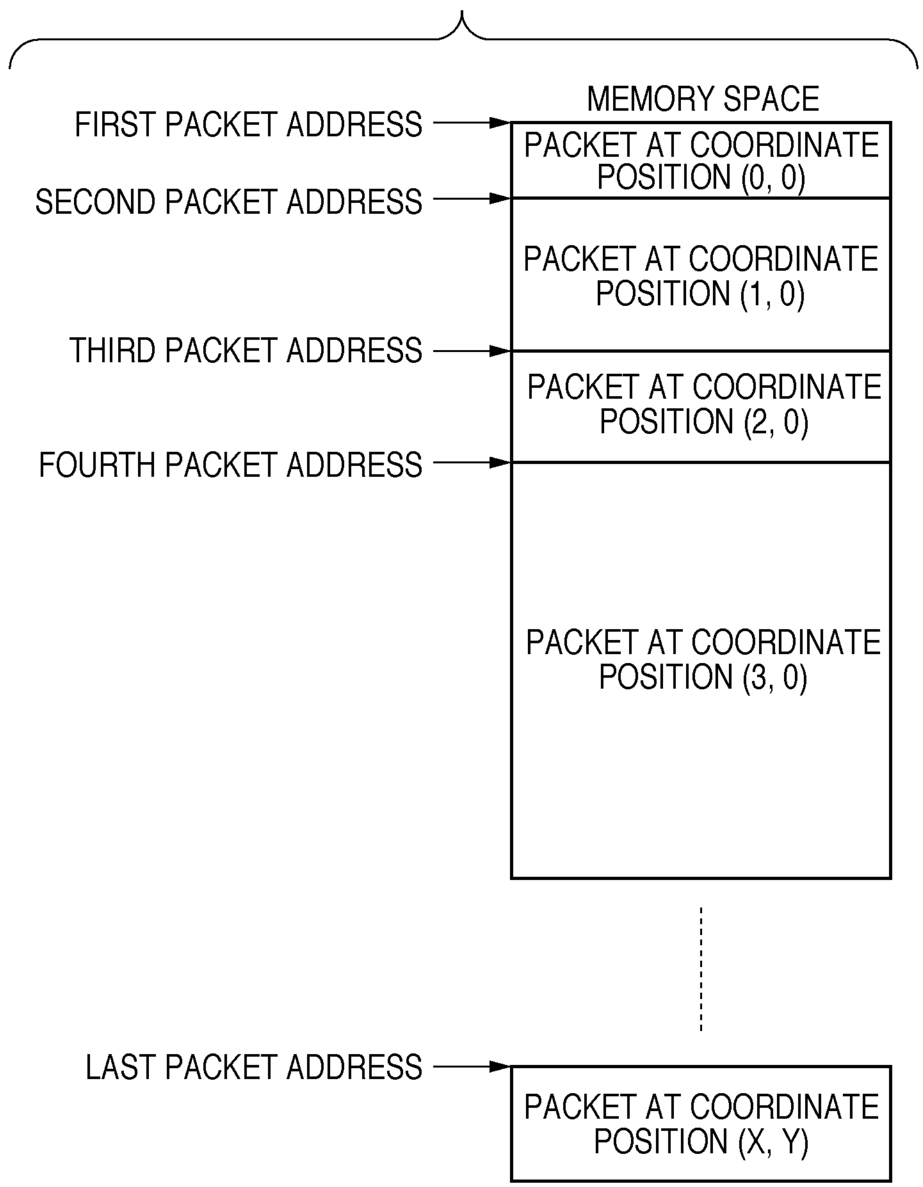
FIG. 12 is a view showing the address of each packet written in a memory space.

When the data is written on the memory for each tile mentioned above, the size differs for each packet, as shown in FIG. 12, so respective packets have discrete start addresses. Hence, the start address of a packet at an arbitrary coordinate position is searched for using the packet management table shown in FIG. 11. Therefore, if the writing address of the first packet is known, the start address of an arbitrary packet can be obtained using the data size up to the coordinate position described in the packet management table as an offset. For example, to read the third packet shown in FIG. 12, the sum total of the sizes of the first and second packets is obtained based on the packet management table, and the address of the first packet is given by the offset, thereby calculating the third packet address. Data on the third packet can be obtained by reading the data at the third packet address.

In this manner, because arbitrary data can be accessed for each tile, an image can be partially processed. For example, to extract and process a partial region in an image, data on a packet corresponding to this region need only be obtained and processed.

[Expansion Processing]

Figure 13:
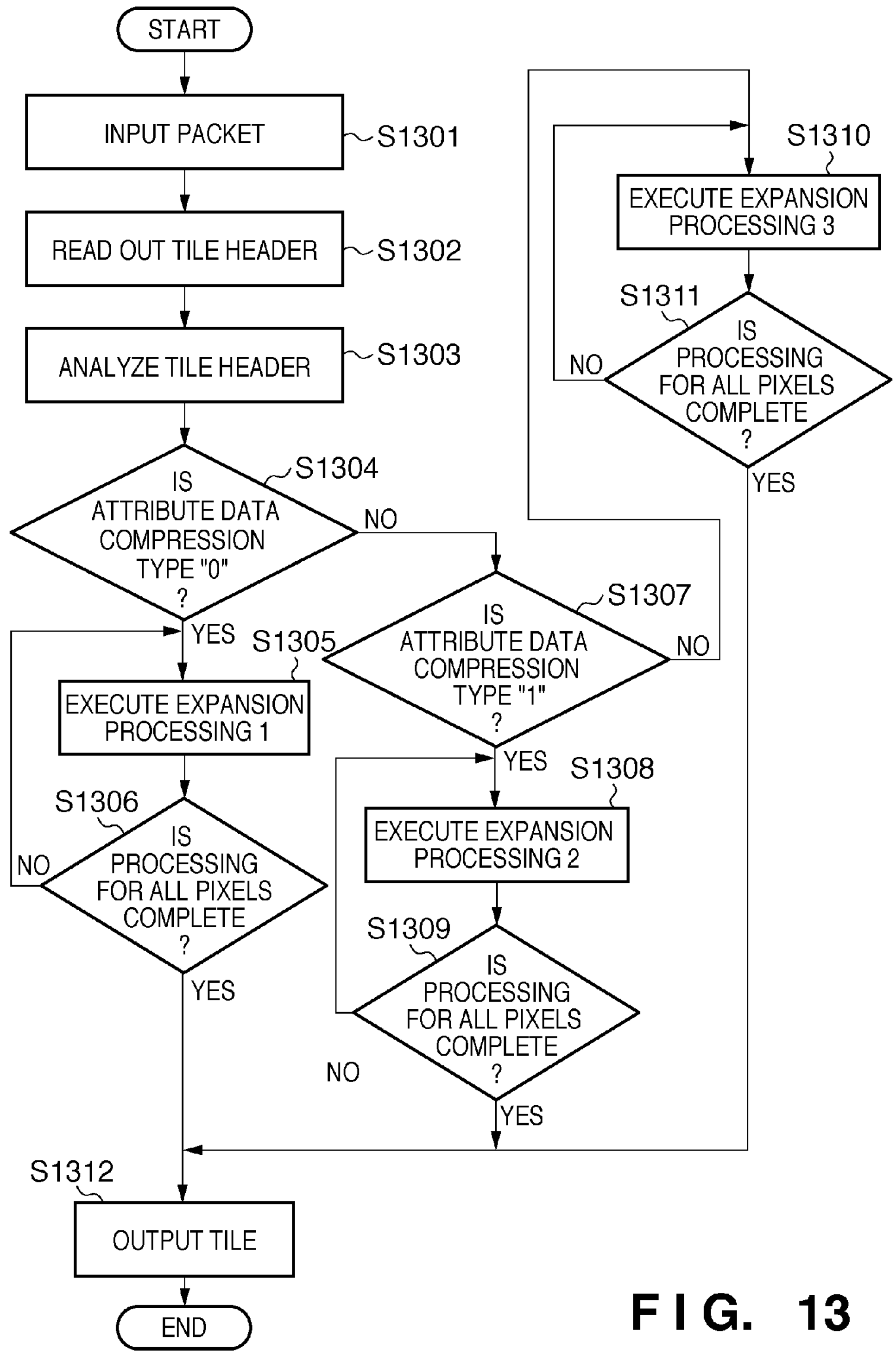
FIG. 13 is a flowchart showing expansion processing according to the embodiment.

Expansion processing according to this embodiment will be described next with reference to FIG. 13. The above-mentioned compression processing is lossless compression processing, so the image compressed by this processing can be restored to the original image using information included in the packet. Note that in this embodiment, this processing is performed by reading out and executing a program stored in a storage unit such as the ROM 202 by the CPU 201, unless otherwise specified. When the processing starts, first, packet data shown in FIG. 13 is input (S1301). A tile header in the packet data is read out (S1302), and is analyzed (S1303). It is determined based on the tile header analysis result whether the attribute data compression type is "0" (S1304). If the attribute data compression type is "0" (YES in step S1304), expansion processing 1 is executed (S1305). In expansion processing 1, the pattern flag, the bitmap first color data, the bitmap second, third, and fourth color data, the attribute data corresponding to the first pixel value, and the attribute data corresponding to the second, third, and fourth pixel values, which are stored in the packet, are read out to rasterize the data into pixels. The above-mentioned processing is repeated until all pixels stored in the packet are processed (YES in step S1306).

If the attribute data compression type is not "0" (NO in step S1304), it is determined whether the attribute data compression type is "1" (S1307). If the attribute data compression type is "1" (YES in step S1307), expansion processing 2 is executed (S1308). In expansion processing 2, the pattern flag, the bitmap first color data, and the bitmap second, third, and fourth color data, which are stored in the packet, are read out to rasterize the data into a bitmap. Further, the attribute data corresponding to the first pixel value is read out to set, for each block, attribute data identical for all pixels in a corresponding block. The above-mentioned processing is repeated until all pixels stored in the packet are processed (YES in step S1309).

If the attribute data compression type is not "1" (that is, the attribute data compression type is "2") (NO in step S1307), expansion processing 3 is executed (S1310). In expansion processing 3, the pattern flag, the bitmap first color data, and the bitmap second, third, and fourth color data, which are stored in the packet, are read out to rasterize the data into a bitmap. Further, the representative attribute data stored in the tile header is read out to set attribute data identical for all pixels in the tile. The above-mentioned processing is repeated until all pixels stored in the packet are processed (YES in step S1311). When processing for all pixels is complete in step S1306, S1309, or S1311, the data is written on the memory for each tile (S1312).

According to this embodiment, it is possible to improve the compression efficiency when image data accompanied by attribute data is processed for each pixel. Especially in a block of 2×2 pixels or a tile of 32×32 pixels, it is often the case that these pixels have different color data but have identical attribute data, and the compression efficiency can be improved in that case. The attribute data is not limited to 8 bits per pixel, and an arbitrary number of bits such as 1, 4, or 16 bits can also be adopted.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-104231, filed Apr. 28, 2010, which is hereby incorporated by reference herein in its entirety.

What is claimed is:

1. An image processing apparatus comprising:

a tile division unit configured to divide image data, in which a pixel value of each pixel includes color data and attribute data, into tiles each including a predetermined number of pixels;

a block division unit configured to divide each of the tiles, that are divided by said tile division unit, into blocks each having a size of 2×2 pixels;

a specification unit configured to sequentially determine, as a processing object, each of the blocks divided by said block division unit, and to compare pixel values of respective pixels in the block that is the processing object, thereby specifying a pattern flag indicating an arrangement pattern of pixel values included in each of the blocks;

an extraction unit configured to extract first color data and first attribute data from a pixel value corresponding to a pixel at a predefined position in each of the blocks, and further to extract, from a block for which it is determined that the number of pixel values included in the block is one of 2 to 4, second color data to fourth color data and second attribute data to fourth attribute data corresponding to a second pixel value to a fourth pixel value corresponding to the arrangement pattern defined in the specified pattern flag;

a first holding unit configured to hold, in a memory, the pattern flag of each of the blocks, that is specified by said specification unit, the first color data extracted by said extraction unit, the second color data to fourth color data extracted by said extraction unit, the first attribute data extracted by said extraction unit, and the second attribute data to fourth attribute data extracted by said extraction unit;

a first determination unit configured to determine whether attribute data of all pixels included in the tile are identical; and a deletion unit configured, if said first determination unit determines that the attribute data of all the pixels included in the tile are identical, to perform control to delete the first attribute data and the second attribute data to fourth attribute data, that are held in said first holding unit, and to store, in header information, information indicating that the attribute data in the tile are identical and information of the attribute data determined to be identical.

2. The apparatus according to claim 1, further comprising a second determination unit configured to determine whether the attribute data of the pixels included in the tile are identical for each block in the tile, wherein if said second determination unit determines that the attribute data of the pixels included in the tile are identical for each block in the tile, said deletion unit performs control to delete the second attribute data to fourth attribute data, that are held in said first holding unit, and store, in the header information, information indicating that the attribute data are identical for each block in the tile.

3. The apparatus according to claim 1, wherein the tile which is divided by said tile division unit and includes the predetermined number of pixels has a size of 2L×2L pixels.

4. The apparatus according to claim 1, further comprising a packing unit configured to generate packet data, in which the pattern flag, the first color data, the second color data to fourth color data, the first attribute data, and the second attribute data to fourth attribute data, that are held in the memory, and the header information, are packed, for each of the tiles after the processing by said deletion unit.

5. The apparatus according to claim 4, further comprising a table generation unit configured to generates a packet management table based on a coordinate position and a size of the packet data that is generated by said packing unit and corresponds to each tile.

6. An image processing method executed by an image processing apparatus, the method comprising:

a tile division step of dividing image data, in which a pixel value of each pixel includes color data and attribute data, into tiles each including a predetermined number of pixels;

a block division step of dividing each of the tiles, that are divided in the tile division step, into blocks each having a size of 2×2 pixels;

a specification step of sequentially determining, as a processing object, each of the blocks divided in the block division step, and comparing pixel values of respective pixels in the block that is the processing object, thereby specifying a pattern flag indicating an arrangement pattern of pixel values included in each of the blocks;

an extraction step of extracting first color data and first attribute data from a pixel value corresponding to a pixel at a predefined position in each of the blocks, and further extracting, from a block for which it is determined that the number of pixel values included in the block is one of 2 to 4, second color data to fourth color data and second attribute data to fourth attribute data corresponding to a second pixel value to a fourth pixel value corresponding to the arrangement pattern defined in the specified pattern flag;

a first holding step of holding, in a memory, the pattern flag of each of the blocks, that is specified in the specification step, the first color data extracted in the extraction step, the second color data to fourth color data extracted in the extraction step, the first attribute data extracted in the extraction step, and the second attribute data to fourth attribute data extracted in the extraction step;

a first determination step of determining whether attribute data of all pixels included in the tile are identical;

if it is determined in the first determination step that the attribute data of all the pixels included in the tile are identical, a deletion step of controlling to delete the first attribute data and the second attribute data to fourth attribute data, that are held in the first holding step, and store, in header information, information indicating that the attribute data in the tile are identical and information of the attribute data determined to be identical; and wherein at least one of the steps is performed by a processor.

7. The method according to claim 6, further comprising:

a second determination step of determining whether the attribute data of the pixels included in the tile are identical for each block in the tile, wherein if it is determined in the second determination step that the attribute data of the pixels included in the tile are identical for each block in the tile, it is controlled in the deletion step to delete the second attribute data to fourth attribute data, that are held in the first holding step, and store, in the header information, information indicating that the attribute data are identical for each block in the tile.

8. A non-transitory computer-readable medium storing a program for causing a computer to function as each unit defined in claim 1.

* * * * *